United States Patent
Norris et al.

(10) Patent No.: US 12,117,398 B2
(45) Date of Patent: Oct. 15, 2024

(54) OPTICAL ACTIVITY MEASUREMENTS WITH FREQUENCY MODULATION

(71) Applicant: ETH Zurich, Zurich (CH)

(72) Inventors: David J. Norris, Zürich (CH); Daniel Gisler, Zürich (CH); Carin Rae Lightner, Zürich (CH)

(73) Assignee: ETH Zurich, Zurich (CH)

( * ) Notice: Subject to any disclaimer, the term of this patent is extended or adjusted under 35 U.S.C. 154(b) by 53 days.

(21) Appl. No.: 17/923,792

(22) PCT Filed: May 4, 2021

(86) PCT No.: PCT/EP2021/061704
§ 371 (c)(1),
(2) Date: Nov. 7, 2022

(87) PCT Pub. No.: WO2021/224243
PCT Pub. Date: Nov. 11, 2021

(65) Prior Publication Data
US 2023/0184680 A1    Jun. 15, 2023

(30) Foreign Application Priority Data
May 8, 2020  (EP) ..................... 20173726

(51) Int. Cl.
*G01N 21/64* (2006.01)
(52) U.S. Cl.
CPC .............. *G01N 21/6445* (2013.01)
(58) Field of Classification Search
CPC .................................. G01N 21/6445
See application file for complete search history.

(56) References Cited

U.S. PATENT DOCUMENTS

| 7,369,234 B2 * | 5/2008 | Beaglehole | G01N 21/211 250/225 |
| 2004/0169854 A1 * | 9/2004 | Vo-Dinh | G01N 21/65 356/301 |
| 2004/0169923 A1 | 9/2004 | Hug | |

FOREIGN PATENT DOCUMENTS

| EP | 1 334 339 A1 | 8/2003 |
| EP | 2 270 470 A | 1/2011 |

(Continued)

OTHER PUBLICATIONS

Lisa V. Poulikakos et al., "Chiral Light Design and Detection Inspired by Optical Antenna Theory", Nano Letters, Mar. 13, 2018, pp. 4633-4640,, vol. 18, No. 8.

(Continued)

*Primary Examiner* — David P Porta
*Assistant Examiner* — Fani Polyzos Boosalis
(74) *Attorney, Agent, or Firm* — Sughrue Mion, PLLC

(57) ABSTRACT

A system (1) for measuring the optical activity of a sample (2) comprises at least one frequency modulation device (3), at least one synchronization device (4), and at least one detection device (5). The frequency modulation device (3) is configured to modulate a frequency of incident electromagnetic radiation being emitted from a sample (2) and/or being irradiated on to a sample (2) with at least one frequency modulation signal (Sf). The synchronization device (4) is configured to receive the at least one frequency modulation signal (Sf) and to emit at least one detection modulation signal (Sd) being synchronized with the at least one frequency modulation signal (Sf). The system (1) is configured such that the detection device (5) detects the electromagnetic radiation (EMs) in synchronization with the detection modulation signal (Sd).

21 Claims, 11 Drawing Sheets

(56) References Cited

FOREIGN PATENT DOCUMENTS

| | | |
|---|---|---|
| JP | 61-145421 A | 7/1986 |
| JP | 2013-050394 A | 3/2013 |

OTHER PUBLICATIONS

Written Opinion for PCT/EP2021/061704, dated Jul. 14, 2021.
International Search Report for PCT/EP2021/061704, dated Jul. 14, 2021.

* cited by examiner

OPTICAL ACTIVITY MEASUREMENTS WITH FREQUENCY MODULATION

CROSS REFERENCE TO RELATED APPLICATIONS

This application is a National Stage of Application No. PCT/EP2021/061704 filed May 4, 2021, claiming priority based on European Patent Application No. 20 173 726.9 filed May 8, 2020.

TECHNICAL FIELD

The present invention relates to a system for measuring the optical activity of a sample according to claim 1, to a method for measuring the optical activity of a sample according to claim 14, and to a method of producing a system for measuring the optical activity of a sample according to claim 15.

PRIOR ART

A majority of pharmaceutical compounds are chiral, wherein the effect of the drug depends on its chirality. In fact, the enantiomers of a chiral drug differ in their interactions with enzymes, proteins, receptors, etc., wherein these differences in interactions, in turn, lead to differences in the biological activities of the two enantiomers such as their pharmacology, pharmacokinetics, metabolism, toxicity, immune response, and so forth. An enantioselective synthesis or a chiral separation of racemic drugs and a subsequent inspection are therefore necessary operations in pharmaceutical industry as well as in clinical therapeutics.

Optical activity is the property of chiral compounds to change the polarization of electromagnetic radiation. For this reason, spectroscopy is a common means for inspecting chiral compounds. For example, US 2004/0169923 A1 discloses the application of spectroscopy to measurement of circularly polarized light, wherein a selective inter-conversion of polarization states of coherent and incoherent light is used to achieve a time-averaged offset-free measurement of optically active scattering or circular dichroism. To this end, optical elements are inserted into the optical path of either the exciting light or into the optical path of the transmitted or scattered light.

This system as well as other current systems to measure separate left- and right-handed light spatially on to a CCD detector before readout. These systems are slow, difficult to manufacture and maintain and suffer from high noise. While the current state of the art instruments have been commercialized they are not nearly as widely utilized as they could be.

SUMMARY OF THE INVENTION

It is an object of the present invention to provide a system for measuring the optical activity of a sample which overcomes the drawbacks of the state of the art. In particular, it is an object of the present invention to provide a system for measuring the optical activity of a sample which has a high optical throughput and at the same time is sensitive and stable.

In particular, system for measuring the optical activity of a sample is provided, which system comprises at least one frequency modulation device, at least one synchronization device, and at least one detection device. The at least one frequency modulation device is configured to modulate a frequency of incident electromagnetic radiation being emitted from a sample and/or being irradiated on to a sample with at least one frequency modulation signal. The at least one synchronization device is configured to receive the at least one frequency modulation signal. The at least one synchronization device is further configured to emit at least one detection modulation signal being synchronized with the at least one frequency modulation signal. The system is configured such that the at least one detection device detects incident electromagnetic radiation in synchronization with the at least one detection modulation signal.

Hence, it is conceivable to irradiate electromagnetic radiation on to the sample so as to excite the sample, and to then modulate a frequency of the electromagnetic radiation being emitted from the excited sample upon its relaxation. In this case the frequency modulation device is arranged after the sample with respect to an optical path extending from an excitation source towards the detection device. An excitation of the sample in this case preferably takes place with electromagnetic radiation that has not been frequency-modulated. However, it is likewise conceivable to modulate a frequency of electromagnetic radiation that is then irradiated on to the sample so as to excite the sample. In this case the frequency modulation device is arranged before the sample with respect to the optical path. Thus, in this latter case an excitation of the sample takes place with electromagnetic radiation having been frequency-modulated.

In both cases the electromagnetic radiation being emitted from the excited sample is detected. Hence, the present system is based on a frequency modulation in emissive optical activity measurements.

The frequency modulation is preferably achieved by applying at least one electrical signal to the frequency modulation device, and wherein this same electrical signal is preferably also sent to the synchronization device. In other words, it is preferred that the frequency modulation signal corresponds to the signal that is sent to the synchronization device.

Because the detection modulation signal being emitted from the synchronization device is synchronized with the frequency modulation signal the system enables a detection of the electromagnetic radiation being emitted from the sample that is modulated in sync with the frequency modulation signal.

Thus, the present system enables measurements of the optical activity using frequency modulation to separate optical signals. In this way the present system allows efficient measurements of the optical activity of a sample starting from a few minutes. Further advantages lie in the stability of the components of the system which require less maintenance, are easy to manufacture and easier for non-expert users. Furthermore, the frequency modulation reduces any noise and thereby increases the measurement accuracy. Therefore, the present system makes it possible to turn a slow, niche measurement as it is performed with the known systems into a routine measurement done in a variety of industrial and academic laboratories.

The frequency modulation device is preferably configured to separate components of incident electromagnetic radiation having two or more polarization states into components of electromagnetic radiation having one or more frequencies.

There are three basic types of polarization (degenerate polarization types), which can also be referred to as the Stokes parameters. These basic types are circular, linear, and 45 degree. Any electromagnetic radiation that is a mix of these three types is called elliptical. Using a frequency modulation device it is possible to separate these polarization states or types into different frequencies, whereby a distinction between left-and right-circular electromagnetic radiation or between +45 and −45 electromagnetic radiation can be achieved. In particular, the frequency modulation device as it is used in the present system enables one to observe the modulation at one of those frequencies and to synchronize it with the detection device. In this way a time versus intensity separation is obtained.

The electromagnetic radiation being incident on the frequency modulation device preferably comprises elliptically polarized electromagnetic radiation that can be expressed as degenerate polarization states such as horizontally linearly polarized states, vertically linearly polarized states, left-handed circularly polarized states, or right-handed circularly polarized states. However, other polarization states are likewise conceivable.

The frequency modulation device is configured to separate the electromagnetic radiation having these different polarization states into components of electromagnetic radiation having one or more frequencies. For example, if the electromagnetic radiation being incident on the frequency modulation device comprises circularly polarized states and linearly polarized states, the frequency modulation device will ascribe or assign a first frequency to the circularly polarized states of the electromagnetic radiation and a second frequency being different from the first frequency to the linearly polarized states.

Left handed circularly polarized electromagnetic radiation and right handed circularly polarized electromagnetic radiation can be detected separately from one another by the detection device by modulating circularly polarized electromagnetic radiation comprising both left and right handed polarization states at a given frequency, and by detecting this modulated electromagnetic radiation in synchronization with the detection modulation signal emitted by the synchronization device and preferably with the aid of a masking device, see further below.

Hence, the frequency modulation device can be seen as a polarization state converter. In particular, the frequency modulation device preferably has a frequency-variable retardance. For example, if the frequency modulation device is set to a "quarter wave retardance" it will preferably sinusoidally oscillate between a plus-quarter-wave (+QW) and a minus-quarter-wave(−QW) retardance, which in turn means that the circular component of the electromagnetic radiation will be converted to and oscillate between +1/−1 linear polarization states. At an exemplary time of t=1 of the oscillation, the retardation is +QW and left-handed circular electromagnetic radiation (LHCPL) is "converted" to +1 linear polarization and right-handed-circularly polarized electromagnetic radiation (RHCPL) is "converted" to +1 linear polarization states. If a linear polarizer is used, see also further below, said polarizer converts this to an intensity signal. At an exemplary time of t=2 the process reverses into a −QW retardation which means LHCPL goes to the −1 linear polarization state and RHCPL goes to the +1 linear polarization state.

Hence, if one sets the modulation to QW, a signal at a given frequency is obtained (determined by the modulation) which varies in intensity slightly with time and based on the amount of LHCPL and RHCPL. The detection device and the masking device (see further below) then take this signal at one frequency and then separate the RHCPL and LHCPL by synchronizing a masking performed by the masking device with the frequency of the modulation, so that the detection device reads "time=1" of the oscillation on one of its areas such as on one row of a detection device being a CCD sensor and "time=2" on another area of the detection device such as on another row of the CCD sensor.

It should be noted that the retardance of the frequency modulation device preferably is a setting that can be changed. In fact, if one wishes to generate circularly polarized electromagnetic radiation the setting of the frequency modulation device should be set to a QW retardation, and if one wishes to generate linearly polarized electromagnetic radiation the frequency modulation device should be set to a so-called half wave (HW) retardation.

Hence, the present system preferably employs a frequency modulation to separate different polarization states from one another. In other words, the present system enables frequency-polarization-modulation measurements for recording an optical activity.

The frequency modulation signal is preferably configured to separate two or more polarization states of the electromagnetic radiation being irradiated on to the sample or being emitted from the sample from one another. As will be explained in greater detail below, the frequency modulation signal preferably is of a sinusoidal shape and/or of a square shape and is preferably provided by means of a frequency modulation device as it is known in the art and being commercially available.

The system can be configured such, that the components of electromagnetic radiation having one or more frequencies are detected simultaneously or temporarily delayed with respect to one another by the detection device.

That is to say, if the frequency-modulated electromagnetic radiation comprises two or more frequency components, these two or more frequency components can be detected simultaneously or temporarily delayed.

Where detection is understood to be the read out of the electrical signal from the detection device, simultaneous detection can be achieved with the use of a selective masking where a masking device (see further below) is moved to different one or more areas of the detection device in sync with the modulation of the detection device and then after some time all polarization states are read out, i.e. detected simultaneously.

Where temporally delayed detection is achieved by using a fast detection device which can detect directly in sync with the modulation and the different polarization states are read out directly at different times from the detection device. Hence, whether one detects one frequency or more depends on what the modulation looks like and how it couples to the detection device and/or to the masking device. For example, and as just explained, two frequencies can be detected "simultaneously" in that they are measured in the same measurement, but they are shifted in time with one another in the same way that left and right handed circularly polarized electromagnetic radiation are separated at different time steps.

The system preferably further comprises at least one intensity modulation device, wherein the intensity modulation device is configured such, that an intensity of incident electromagnetic radiation is modulated, whereby intensity-modulated electromagnetic radiation is generated.

The intensity modulation device preferably is a polarizer, particularly preferably a linear polarizer.

The intensity modulation device is preferably configured to modulate an intensity of incident electromagnetic radiation such, that the intensity of the electromagnetic radiation of the unwanted polarization state is eliminated or at least reduced. The unwanted polarization state refers to said polarization state of the electromagnetic radiation that shall not be detected by the detection device at a particular point in time. In this way the intensity modulation device enables an additional polarization modulation of the electromagnetic radiation.

The intensity modulation device is preferably arranged after the frequency modulation device with respect to the optical path.

If an intensity modulation device is present in the system said intensity-modulated electromagnetic radiation is preferably detected by the detection device. In other words, in this case the system is preferably configured such, that the detection device detects the intensity-modulated electromagnetic radiation.

The system preferably further comprises at least one masking device, wherein the masking device is configured to mask one or more areas of the detection device such, that the detection device is prevented from detecting incident electromagnetic radiation, preferably incident intensity-modulated electromagnetic radiation, in these one or more masked areas.

If a masking device is present, the synchronization device is preferably in connection with the masking device, wherein the synchronization device is configured to send the detection modulation signal to the masking device, and wherein the masking device is configured to mask one or more areas of the detection device in synchronization with the detection modulation signal.

The detection device preferably is an image sensor and wherein the areas are at least two pixels, preferably at least two pixel rows, particularly preferably at least four or exactly four pixel rows, and wherein the masking device is configured to mask one pixel, preferably one or more pixel rows, particularly preferably at least three pixel rows or exactly three pixels rows at a time.

The synchronization device is preferably configured such, that a particular polarization state is detected by a particular pixel, preferably by a particular pixel row at a time.

That is, the detection device preferably is an image sensor such as a CCD sensor. In the case of a CCD sensor, for example, the masking device is configured to cycle the photo charges between the pixel rows of the CCD sensor. Since the masking device cycles the photo charges in synchrony with the detection modulation signal, the particular pixel or the particular pixel row detects a particular polarization state of the incident sample modulated or, if applicable, intensity-modulated electromagnetic radiation. The masking device is preferably configured to spatially separate different polarization states from one another. Preferably, the masking device corresponds to one or more focusing elements such as micro-lenses in a lens array, which are configured to focus electromagnetic radiation onto a particular area of the detection device such as a particular pixel of the CCD sensor. In other words, the masking device is configured to focus electromagnetic radiation onto an "open" i.e. "unmasked" pixel of the CCD sensor.

For example, if electromagnetic radiation comprising circularly polarized and linearly polarized components is irradiated on to a frequency modulation device being set to a QW retardation with an exemplary frequency of f=1f, the circularly polarized component of electromagnetic radiation is modulated at 1f and the linearly polarized component of said electromagnetic radiation is modulated with an exemplary frequency of f=2f, wherein both said circularly polarized component as well as said linearly polarized component can be detected by the detection device being a 4 row CCD sensor.

It is particularly preferred that the detection device, the masking device, and the synchronization device correspond to the system known as the "Zurich Imaging Polarimeter" (ZIMPOL). In other words, it is preferred that the system comprises a frequency modulation device and a ZIMPOL imaging system. In this case the frequency modulation device is used to separate the polarization states of the incident electromagnetic radiation into different frequencies as described above, wherein this is preferably electronically communicated to the synchronization device of the ZIMPOL system, which synchronization device synchronizes the frequencies to the selective masking of the image sensor and produces a final image with separate measurements of the different polarization states.

If no masking device is present, the synchronization is preferably in connection with the detection device, wherein the synchronization device is configured to send the detection modulation signal to the detection device, and wherein the detection device is configured to detect incident electromagnetic radiation, preferably incident intensity-modulated electromagnetic radiation, in synchronization with the detection modulation signal.

To this end a detection of the individual polarisation states can be achieved in different ways. For example, it is conceivable that the electromagnetic radiation being incident on the detection device is still frequency modulated or intensity-frequency modulated, and wherein the detection device collects from a certain pixel (or group of pixels) at a given frequency. Such a set-up would be a replacement for the masking device. It is however also possible to have a detection device which is sensitive to different polarization states, in which case no linear polarizer to modulate the intensity is required but one would rather directly measure the polarization state.

In any case, by using an image sensor, the present system employs a frequency-polarization-modulation being coupled with a spatially resolved imaging.

The system preferably further comprises at least one separating device, wherein the separating device is configured to spatially separate one or more wavelengths constituting incident electromagnetic radiation, preferably one or more wavelengths constituting incident intensity-modulated electromagnetic radiation, onto the detection device.

Hence, the separating device is configured to break electromagnetic radiation being incident on the separating device into its constituents depending on the wavelength of said incident electromagnetic radiation. The different constituents of the broken electromagnetic radiation is then incident on different areas of the detection device. The separating device is preferably a spectrometer. To this end any type of spectrometer as it is known in the art is conceivable. Said spectrometers typically use a lens or grating or dispersive element which is configured to focus electromagnetic radiation onto the detection device. However, it should be noted that no spectrometer is needed at all. For example, if one wishes to measure essentially Rayleigh scattering a spectrometer can be dispensed with.

The spectrometer thus enables a detection in dependence of or as a function of the wavelength of the electromagnetic radiation being emitted from the sample as well as spatially resolved.

The system preferably further comprises an excitation source, preferably a radiation source such as a laser, wherein the excitation source is configured to excite the sample.

The excitation source is preferably configured to excite the sample into one or more excited states. Upon its relaxation, the sample will emit the above-mentioned emitted electromagnetic radiation. The sample is preferably a chiral sample, such as a solution comprising chiral molecules, or a solid sample comprising or consisting of one or more chiral molecules, or a film comprising or consisting of chiral molecules and being provided on a glass slide or the like, etc. Due to its chirality the sample will change the polarization of the electromagnetic radiation. Different chirooptical phenomena can be measured by means of the present system. For example, the present system can be used to measure the optical activity of a sample by detecting absorption spectra, fluorescence spectra, or scattering spectra. In fact, if absorption spectra are recorded, a differential extinction coefficient for left-handed circularly polarized electromagnetic radiation and right-handed circularly polarized electromagnetic radiation could be determined. These phenomena are referred to as circular dichroism (CD) or vibrational circular dichroism (VCD) in the field of expertise. If fluorescence spectra are recorded, a polarization of the emitted photon or intensity of the emitted photon with different incident polarizations could be determined. These phenomena are referred to as circularly polarized luminescence (CPL) or fluorescence detected circular dichroism in the field of expertise. If scattering spectra are recorded, a differential scattering from left- or right-handed electromagnetic radiation or a different amount of left- and right-handed electromagnetic radiation in the scattered beam, i.e. the electromagnetic radiation being scattered from the sample, could be determined. These phenomena are referred to as Rayleigh or Raman optical activity in the field of expertise. To this end the present system can be used in a forward scattering, a backward scattering, or an angled scattering arrangement as it is known in the art.

In particular, if a backward scattering measurement is performed the electromagnetic radiation being used to excite the sample is irradiated onto the sample from a direction in which the electromagnetic radiation being scattered from the sample is detected by the detection device. In a forward scattering measurement the electromagnetic radiation being used to excite the sample is irradiated onto the sample from a direction being opposite to the direction in which the electromagnetic radiation being scattered from the sample is detected by the detection device. In an angled scattering measurement the electromagnetic radiation is irradiated onto the sample from a direction being arranged at an angle with respect to a direction in which the electromagnetic radiation being scattered from the sample is detected by the detection device.

The system preferably further comprises one or more polarization conditioning elements, the polarization conditioning elements being configured to change a polarization state of electromagnetic radiation being incident on the polarization conditioning elements and are preferably arranged such, that the sample can be irradiated with electromagnetic radiation being unpolarised and/or such, that noise is reduced.

The polarization conditioning elements preferably correspond to one or more linear rotators and/or to one or more circular rotators. A linear rotator is configured to rotate the plane of polarization of incident linearly polarized electromagnetic radiation and to reverse the sense of circular polarization. A circular rotator is configured to reverse the sense of incident circularly polarized electromagnetic radiation. The linear and circular rotators are in each case preferably half-wave plates. Moreover, the half-wave plates being used as linear rotators preferably rotate within the optical path extending from the excitation source towards the sample, i.e. within the excitation path, and/or within the optical path extending from the sample, i.e. within the collection path. It is particularly preferred to use two linear rotators within the excitation path and to use one linear rotator within the collection path. The linear rotators are preferably arranged and configured such, that the polarization of incident electromagnetic radiation is destroyed. In other words, the linear rotators are configured to generate unpolarised electromagnetic radiation that is irradiated on to the sample and to eliminate linearly polarized states from the electromagnetic radiation being emitted from the sample. The half-wave plates being used as circular rotators are preferably moved into and out of the excitation path. These circular rotators are preferably configured and arranged such that two or more spectral images are generated and subtracted from each other so as to eliminate noise. This procedure is also known as virtual enantiomers in the field of expertise.

In this regard it should be noted that the system enables a measurement of the optical activity of a sample if unpolarised electromagnetic radiation or polarized electromagnetic radiation is irradiated on to the chiral sample. In fact, unpolarised electromagnetic radiation can be irradiated onto the sample. In this case, left and right circular electromagnetic radiation as well as linearly polarized electromagnetic radiation can be detected.

It is likewise conceivable to irradiate circularly polarized electromagnetic radiation onto the sample. In this case left and right circular electromagnetic radiation as well as linearly polarized electromagnetic radiation can be detected. It is however also conceivable that linearly polarized electromagnetic radiation is irradiated onto the sample. In this case left and right circular electromagnetic radiation as well as linearly polarized light can be detected. That is, unpolarised or randomly polarized as well as polarized electromagnetic radiation can be used to excite the sample. However, it has been determined that unpolarised or randomly polarized electromagnetic radiation is preferably used to excite the sample. In fact, if polarized electromagnetic radiation is used to excite the sample the polarization state of said radiation should be maintained during the measurement, which is rather difficult.

The system preferably further comprises at least one filter element, preferably a Rayleigh filter, which is configured to filter one or more wavelengths of the electromagnetic radiation, preferably of intensity-modulated electromagnetic radiation being incident on the filter element.

The filter element preferably filters electromagnetic radiation being emitted by the excitation source, typically laser radiation. In other words, the filter element can be used for removing any contributions from the excitation source. Various arrangements of the filter element are conceivable. For example, the filter element can be arranged, with respect to the optical path, before or after the sample, before or after the frequency modulation device, before or after the intensity modulation device, etc.

The frequency modulation device is preferably a high frequency modulation device, preferably at least one of a photoelastic-modulator, a liquid crystal retarded, and a Pockels cell. Additionally or alternatively, the frequency modulation device is preferably configured to modulate with a frequency being higher than 500 Hz, preferably higher than 1 kHz.

As already mentioned above, the frequency modulation device preferably corresponds to a commercially available device that is well-known in the art. The frequency modulation signal being generated depends on the frequency modulation device being used. For example, if a liquid crystal retarder is used as frequency modulation device, frequency modulation signals having a square shape are generated. A photoelastic-modulator, also called PEM, however, is based on a strain-birefringence response of the material and generates frequency modulation signals having a sinusoidal shape.

In a further aspect a method for measuring the optical activity of a sample, preferably with a system as described above, is provided, the method comprising the steps of: i) irradiating electromagnetic radiation onto a sample so as to excite the sample and modulating a frequency of the electromagnetic radiation being emitted from the excited sample with at least one frequency modulation signal of at least one frequency modulation device, and/or ii) modulating a frequency of electromagnetic radiation being irradiated on to a sample with at least one frequency modulation signal of at least one frequency modulation device so as to excite the sample with frequency-modulated electromagnetic radiation, iii) synchronizing at least one detection modulation signal with the at least one frequency modulation signal using at least one synchronization device, and iv) detecting electromagnetic radiation in synchronization with the at least one detection modulation signal using at least one detection device.

That is to say and as has already been outlined initially, it is conceivable to irradiate electromagnetic radiation on to the sample so as to excite the sample, and to then perform a frequency modulation with the electromagnetic radiation being emitted from the excited sample upon its relaxation. Additionally or alternatively, it is also conceivable to perform a frequency modulation with electromagnetic radiation that is then irradiated on to the sample so as to excite the sample.

The method steps i) to iv) are preferably carried out in the order i) to iv).

Any statements and explanations provided with respect to the system likewise apply to the method for measuring the optical activity of a sample and vice versa.

In a further aspect a method of producing a system for measuring the optical activity of a sample, in particular a method of producing a system as described above, is provided, the method comprising the steps of: i) providing at least one frequency modulation device, ii) providing at least one synchronization device; and iii) providing at least one detection device. The at least one frequency modulation device is configured to modulate a frequency of incident electromagnetic radiation being emitted from a sample and/or being irradiated on to a sample with at least one frequency modulation signal. The at least one synchronization device is configured to receive the at least one frequency modulation signal. The at least one synchronization device is further configured to emit at least one detection modulation signal being synchronized with the at least one frequency modulation signal. The system is configured such that the at least one detection device detects incident electromagnetic radiation in synchronization with the at least one detection modulation signal.

That is to say and as has already been outlined initially, it is conceivable to irradiate electromagnetic radiation on to the sample so as to excite the sample, and to then perform a frequency modulation with the electromagnetic radiation being emitted from the excited sample upon its relaxation. Additionally or alternatively, it is also conceivable to perform a frequency modulation with electromagnetic radiation that is then irradiated on to the sample so as to excite the sample.

The method steps i) to iv) can be carried out in the order i) to iv) but can likewise be carried out in any other order.

Any statements and explanations provided with respect to the system or the method for measuring the optical activity of a sample likewise apply to the method for of producing a system for measuring the optical activity of a sample and vice versa.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
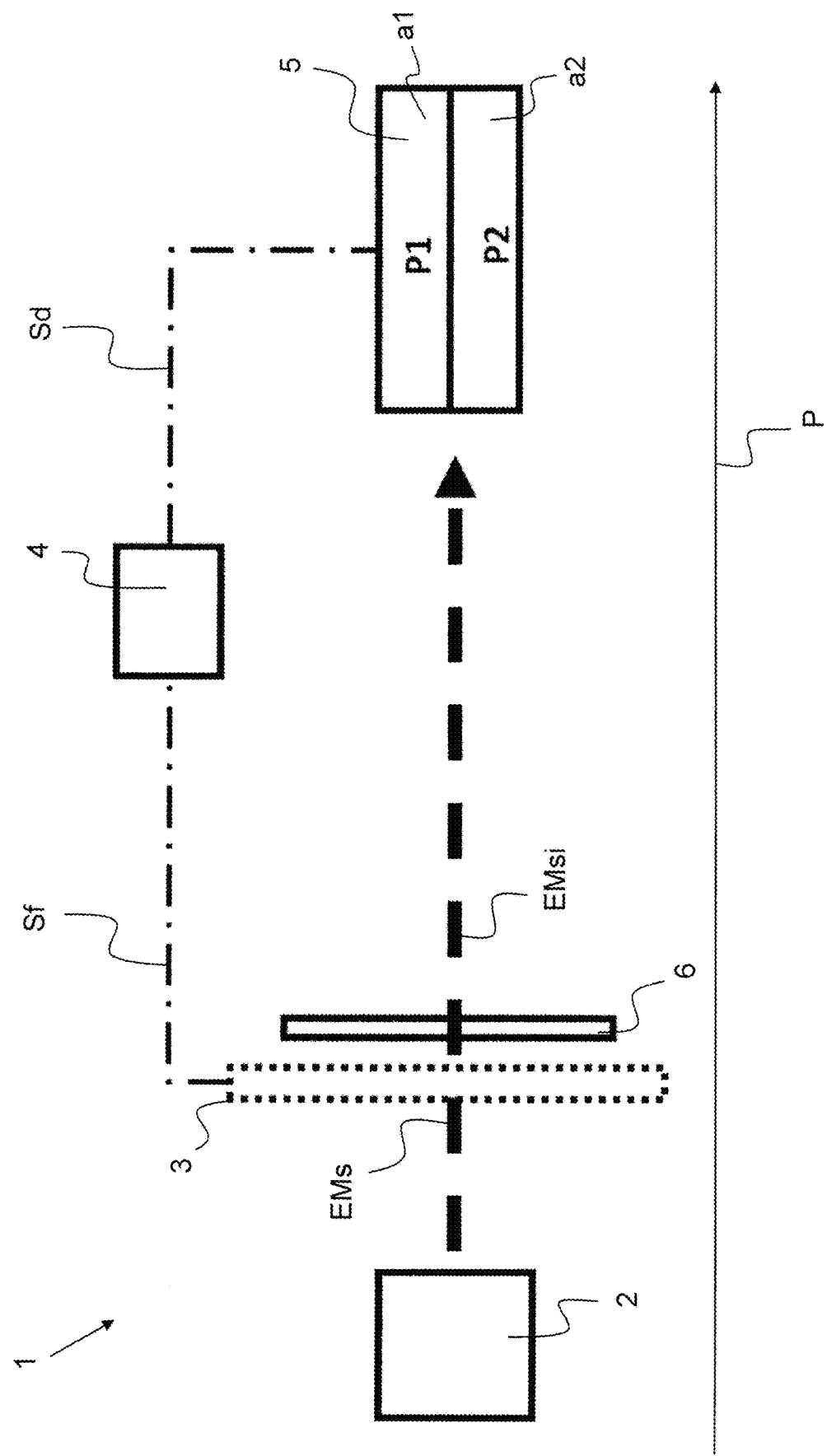
FIG. 1 shows a schematic view of a system comprising a frequency modulation device and an intensity modulation device.
Figure 2:
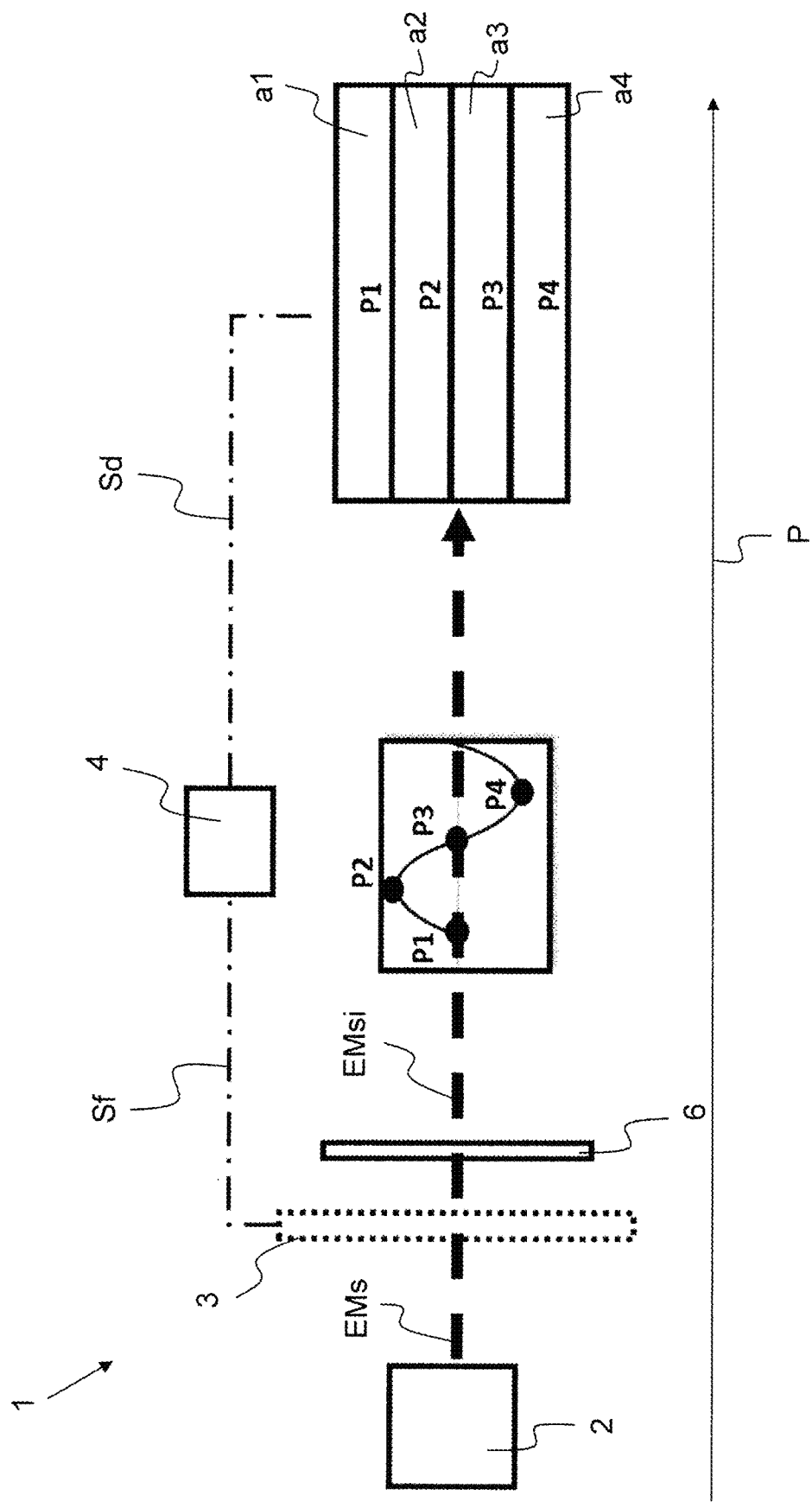
FIG. 2 shows a schematic view of a system comprising a frequency modulation device and an intensity modulation device according to another embodiment.

FIGS. 1 to 9 depict various embodiments of a system 1 for measuring the optical activity of a sample 2. The system 1 according to these figures in each case comprises a frequency modulation device 3, a synchronization device 4, and a detection device 5. Although not depicted in the figures the system 1 further comprises an excitation source that is configured to excite the sample 2. The excitation source preferably corresponds to a radiation source such as a laser, wherein the radiation source is configured to radiate electromagnetic radiation EM. Said electromagnetic radiation EM is indicated by means of a solid line and defines an optical path P extending from the excitation source to the detection device 5. When electromagnetic radiation EM impinges on the sample 2 it excites the sample 2 into one or more of its excited states. Upon relaxation of the excited sample, electromagnetic radiation EMs is emitted by the sample 2. The electromagnetic radiation EMs being emitted from the sample, in most cases after undergoing further spectroscopic or optical procedures, constitutes the measured quantity which is ultimately detected by the detection device. Herein, the electromagnetic radiation being emitted from the sample upon its relaxation is designated as EMs and is indicated by means of a dashed line.

Depending on the characteristics of the sample 2 and/or the characteristics of the electromagnetic radiation EM being irradiated on to the sample 2, different phenomena such as absorption, fluorescence or scattering can occur and can be measured by means of the present system 1. The system 1 depicted in the figures comprise a detection device 5 being arranged opposite to a direction along which the electromagnetic radiation EM is irradiated on to the sample 2. If the present system 1 is used for scattering measurements the measurements performed by this set-up can be referred to as forward scattering measurements. It should however be noted that any other type of scattering measurement, e.g. backward scattering measurement or an angled scattering measurement can likewise be performed by correspondingly arranging the detection device 5 and/or the excitation source with respect to the sample 2.

The frequency modulation device 3 is configured to modulate a frequency of incident electromagnetic radiation EM, EMs. As is readily apparent from a comparison of FIGS. 1 to 8 with FIG. 9, at least two different arrangements of the frequency modulation device 3 with respect to the sample 2 are conceivable. Namely, in the former case depicted in FIGS. 1 to 8, the frequency modulation device 3 is arranged after the sample 2 with respect to the optical path P. In this case, the electromagnetic radiation EMs being emitted from the excited sample upon its relaxation is incident on the frequency modulation device 3. That is, the electromagnetic radiation EMs being emitted from the sample 2 will be frequency modulated by the frequency modulation device 3. The latter case depicted in FIG. 9 differs from the systems 1 according to FIGS. 1 to 8 in that the frequency modulation device 3 is arranged before the sample 2 with respect to the optical path P. Consequently, the sample 2 is excited with frequency-modulated electromagnetic radiation EM.

It can therefore be said that the frequency modulation device 3 is configured to modulate a frequency of incident electromagnetic radiation EMs being emitted from the sample 2 with at least one frequency modulation signal Sf as well as to modulate a frequency of electromagnetic radiation EM being irradiated on to the sample 2 with at least one frequency modulation signal Sf.

The synchronization device 4 is in communication with the frequency modulation device 3 and is configured to receive the frequency modulation signal Sf being emitted from the frequency modulation device 3. The synchronization device 4 is further configured to emit at least one detection modulation signal Sd being synchronized with the at least one frequency modulation signal Sf, and wherein the system 1 is configured such that the detection device 5 detects incident electromagnetic radiation EMs in synchronization with the detection modulation signal Sd. The frequency modulation is achieved by applying an electrical signal to the frequency modulation device 3, and wherein this same electrical signal is also sent to the synchronization device 4.

Here, again, different schemes are conceivable. Namely, on the one hand side the synchronization device 4 can be in communication with the detection device 5, see FIGS. 1, 2, 5 and 6-9. In this case the synchronization device 4 sends the detection modulation signal Sd to the detection device 5, and the detection device 5 detects the incident electromagnetic radiation EMs in synchronization with the detection modulation signal Sd. In fact, a detection of two polarization states P1 and P2 is detected by the detection device 5 according to FIG. 1 and a detection of four polarization states P1, P2, P3 and P4 is detected by the detection device 5 according to FIG. 2. The detection device 5 according to these figures preferably corresponds to a detection device such as a camera system that is able to detect different polarization states itself. On the other hand it is however likewise conceivable that the synchronization device 4 is in communication with a masking device 7, see FIGS. 3 and 4. The purpose and functioning of said masking device 7 will be explained in greater detail below.

The sample 2 is preferably a chiral sample, such as a solution comprising chiral molecules, or a solid sample comprising or consisting of one or more chiral molecules, or a film comprising or consisting of chiral molecules and being provided on a glass slide or the like, etc. Due to its chirality the sample 2 will change the polarization of the impinging electromagnetic radiation EM.

The frequency modulation device 3 is configured to separate components of incident electromagnetic radiation EM, EMs having two or more polarization states into components of electromagnetic radiation EM, EMs having one or more frequencies. Hence, in the systems 1 according to FIGS. 1 to 8 the electromagnetic radiation EMs being emitted from the sample 2 impinges on the frequency modulation device 3, wherein the frequency modulation device 3 separates different polarization states of the emitted electromagnetic radiation EMs into components of different frequencies. In the system 1 according to FIG. 9 different polarization states of incident electromagnetic radiation EM are separated into different frequencies as well, wherein the sample 2 is thereafter excited with the thus frequency-modulated electromagnetic radiation EM. Hence, in the former case different polarization states of the electromagnetic radiation EMs being emitted from the sample 2 are separated into different frequency components, whereas in the latter case the sample 2 is excited with electromagnetic radiation EM whose different polarization states were beforehand separated into different frequency components. In the latter case it is preferred to detect a total intensity of the electromagnetic radiation EMs being emitted from the excited sample 2 upon its relaxation. To this end it is preferred that at least one polarization conditioning element 9 is arranged after the sample 2 and before the detection device 5 with respect to the optical path P, see FIG. 9. In particular, a polarization conditioning element 9 in the form of a so-called depolarizer such as a Lyot depolarizer can be placed after the sample 2 with respect to the optical path P so that electromagnetic radiation EMs being emitted from the sample 2 upon its relaxation can impinge on the depolarizer 9. The depolarizer 9 will scramble the polarization of said electromagnetic radiation EMs, whereby electromagnetic radiation EMs of random polarization is produced. The thus produced electromagnetic radiation EMs of random polarization can then be directly or indirectly detected by the detection device 5. An indirect detection is depicted in FIG.

9. That is, a spectrometer 8 can be arranged after the depolarizer 9 and before the detection device 5 with respect to the optical path P. The spectrometer 8 serves the purpose of a separating device which is configured to break incident electromagnetic radiation EMs into its constituents depending on the wavelength of said incident electromagnetic radiation EMs. The different constituents of the broken electromagnetic radiation EMs are then incident on different areas a1, a2, . . . of the detection device 5. In the former case, however, it is preferred that the system 1 further comprises at least one intensity modulation device 6. The intensity modulation device 6 is configured such, that an intensity of the incident electromagnetic radiation EMs is modulated, whereby intensity-modulated electromagnetic radiation EMsi is generated. Herein, electromagnetic radiation being emitted from the sample and being further intensity-modulated is designated as EMsi.

It should be noted that said intensity-modulated electromagnetic radiation EMsi still comprises the possibly frequency-modulated electromagnetic radiation EMs having been emitted from the sample 2, with the difference that the electromagnetic radiation further comprises an intensity-modulation. Thus, statements made with respect to electromagnetic radiation having been emitted from the sample or frequency-modulated electromagnetic radiation EMs apply to intensity-modulated electromagnetic radiation EMsi and vice versa. As is readily evident from FIGS. 1 to 8, said intensity modulation device 6 is arranged after the frequency modulation device 3 with respect to the optical path P. The intensity modulation device 6 is a polarizer, preferably a linear polarizer, and it allows one to select one or more particular frequency components of the frequency-modulated electromagnetic radiation EMs. The selected one or more frequency components of the electromagnetic radiation EMsi are more intense than the non-selected one or more frequency components of the electromagnetic radiation EMsi. If the system 1 comprises an intensity modulation device 6 it can be said that intensity-modulated electromagnetic radiation EMsi is incident on the detection device 5. In particular, in the event that the system 1 comprises a frequency-modulation device 3 as well as an intensity modulation device 6 frequency-intensity modulated electromagnetic radiation EMsi can be detected by the detection device 5. Furthermore, and as follows from FIGS. 5 to 8, also in this former case it is conceivable that the system 1 comprises a spectrometer 8. In particular, the spectrometer 8 is preferably arranged after the linear polarizer 6 and before the detection device 5 with respect to the optical path P. Like in the latter case described above, the spectrometer 8 serves the purpose of a separating device which is configured to break incident electromagnetic radiation EMs into its constituents depending on the wavelength of said incident electromagnetic radiation EMs. The different constituents of the broken electromagnetic radiation EMs are then incident on different areas a1, a2, . . . of the detection device 5.

The detection device 5 preferably corresponds to a CCD sensor comprising one or more pixels, in particular one or more pixel rows comprising in each case one or more pixels. Each of these pixels is understood as an area a1, a2, . . . of the detection device 5.

As has been mentioned previously and as follows from FIGS. 3 and 4, the system 1 can additionally comprise at least one masking device 7. The masking device 7 is configured to mask one or more areas a1, a2, a3, a4 of the detection device 5 such, that the detection device 5 is prevented from detecting the incident electromagnetic radiation EMs, preferably the incident intensity-modulated electromagnetic radiation EMsi in the event that an intensity modulation device 6 is used, in these one or more masked areas a1m, a2m, a3m, a4m. As also follows from these figures, the synchronization device 4 is in connection with the masking device 7 so as to send the detection modulation signal Sd to the masking device 7. Consequently, the masking device 7 masks one or more areas a1, a2, a3, a4 of the detection device 5 in synchronization with the detection modulation signal Sd.

The masking device 7 is configured to spatially separate different polarization states of incident electromagnetic radiation EMs from one another. Here, the masking device 7 corresponds to one or more focusing elements 10a, 10b, . . . such as micro-lenses in a lens array, which are configured to focus incident electromagnetic radiation EMs, EMsi onto a particular area a1, a2, . . . of the detection device, e.g. onto a particular pixel of the CCD sensor 5.

Figure 3:
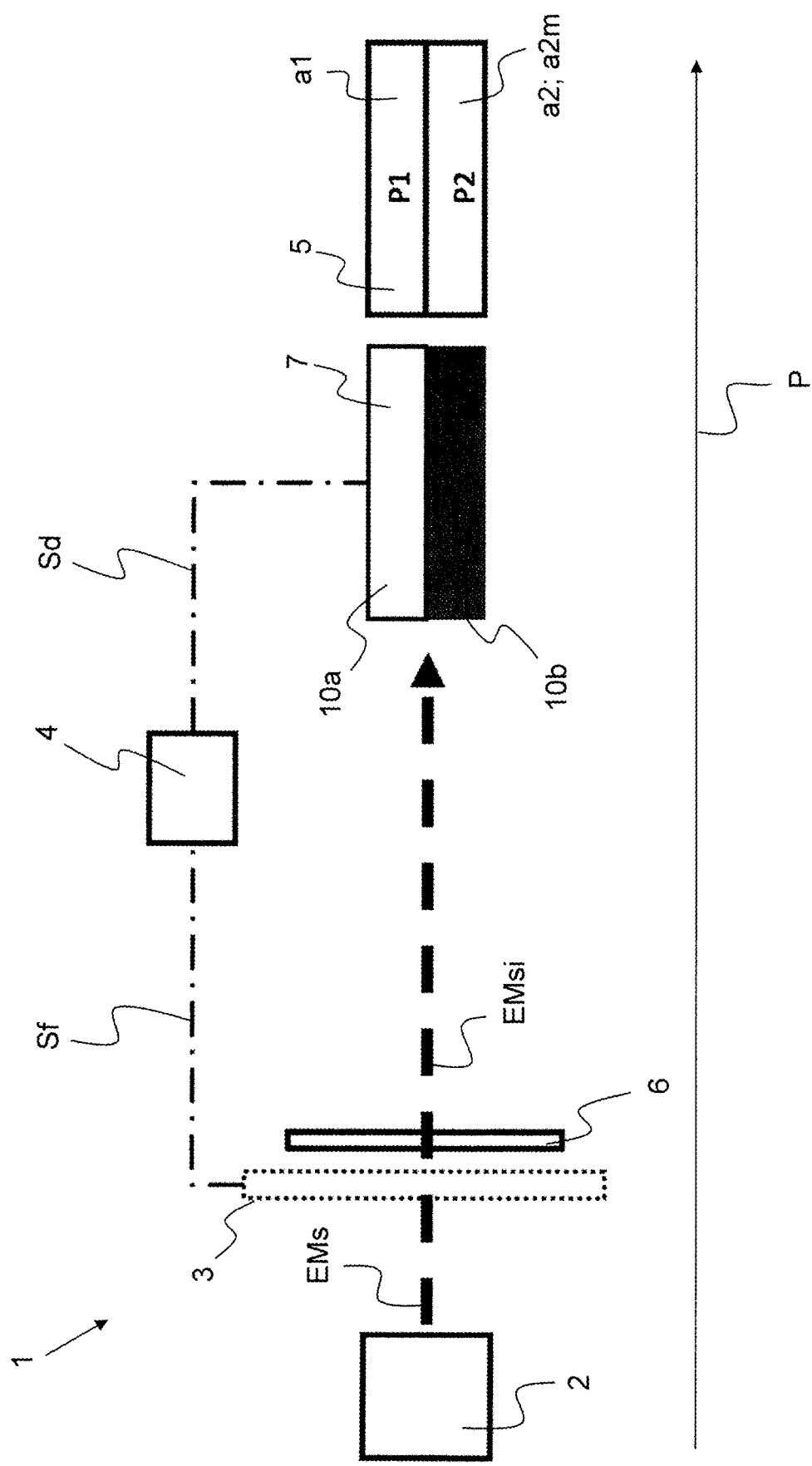
FIG. 3 shows a schematic view of a system comprising a frequency modulation device, an intensity modulation device and a masking device.

The masking device 7 of FIG. 3 comprises two focusing elements, wherein one of the two focusing elements 10a is configured to focus incident electromagnetic radiation EMsi of a first polarization state P1 onto one area a1 of the detection device 5 and wherein the other focusing element 10b is configured to focus incident electromagnetic radiation EMsi of a second polarization state P2 onto another area a2 of the detection device 5. This selective focusing is enabled by the fact that the electromagnetic radiation EMsi is modulated by the frequency modulation device 3 with a frequency modulation signal Sf that corresponds to the detection modulation signal Sd. The second focusing element 10b is depicted in black and shall indicate that said second focusing element 10b is inactive at this particular point in time. Instead, only the first focusing element 10a being depicted in white is active and configured to focus incident electromagnetic radiation EMsi onto the first area a1 of the detection device. Consequently, the second area a2 of the detection device 5 is a masked area a2m, which does not receive any electromagnetic radiation EMsi.

Figure 4:
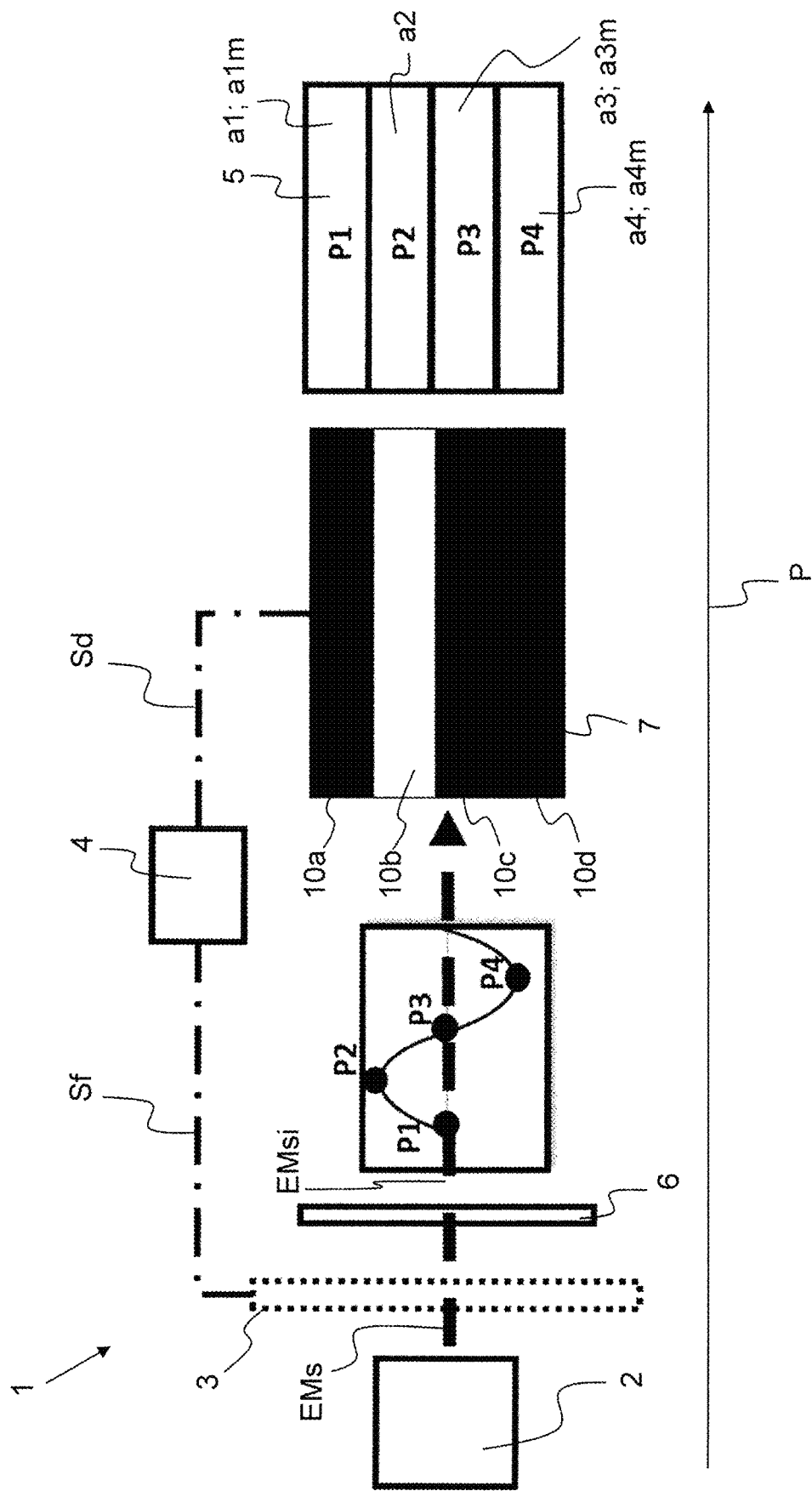
FIG. 4 shows a schematic view of a system comprising a frequency modulation device, an intensity modulation device and a masking device according to another embodiment.
Figure 5:
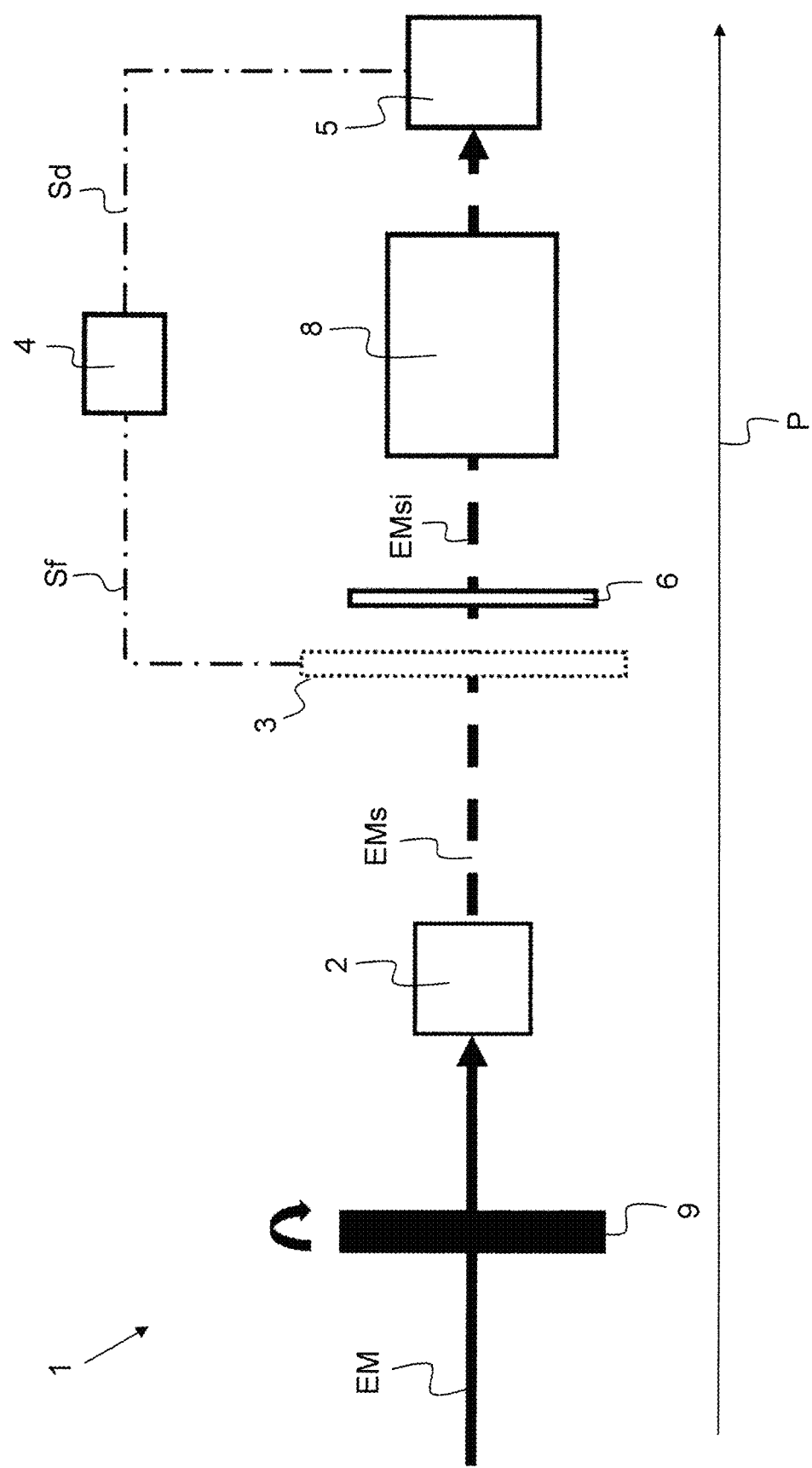
FIG. 5 shows a schematic view of a system comprising a frequency modulation device, an intensity modulation device, a separating device and a polarization conditioning element.
Figure 6:
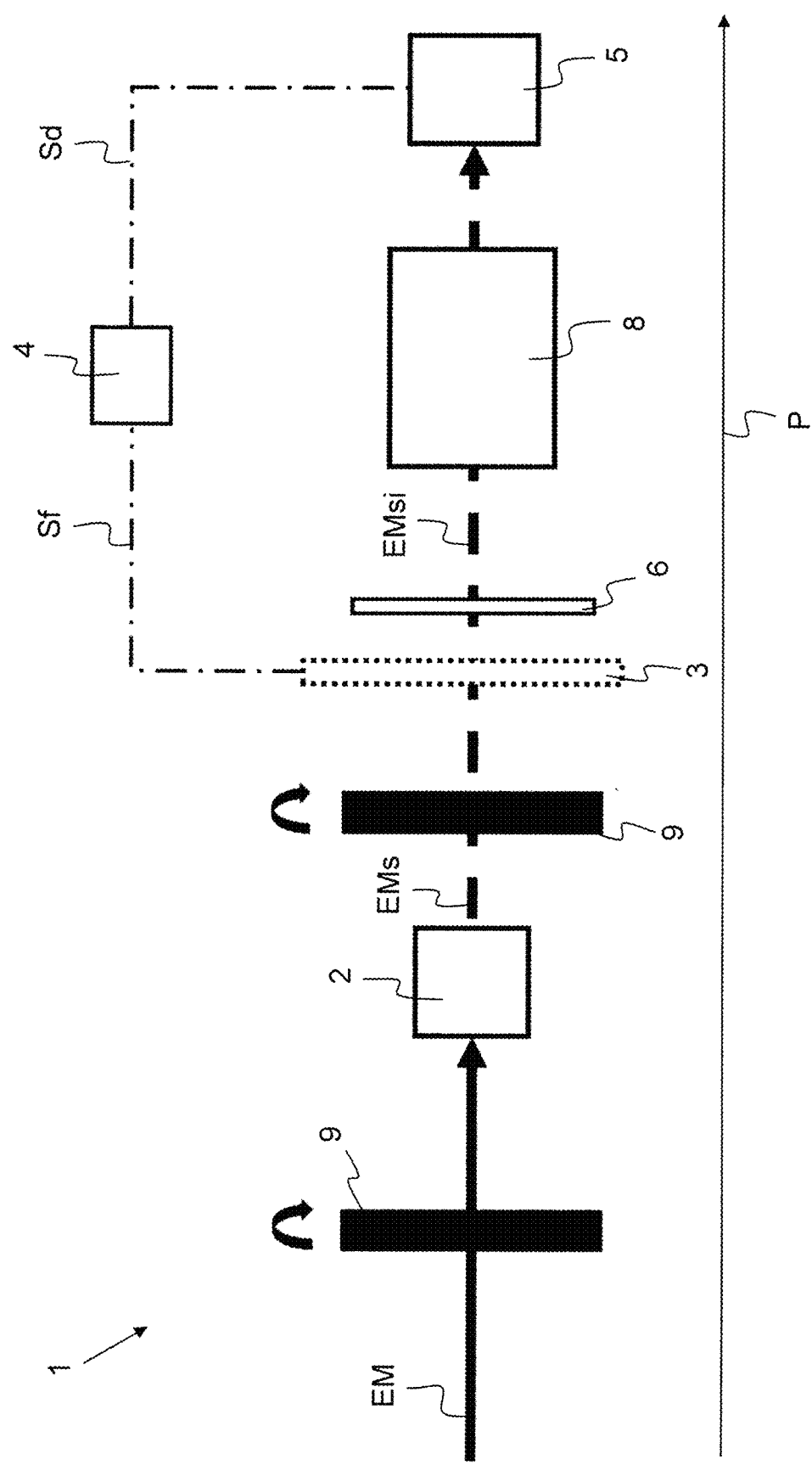
FIG. 6 shows a schematic view of a system comprising a frequency modulation device, an intensity modulation device, a separating device and two polarization conditioning elements.
Figure 7:
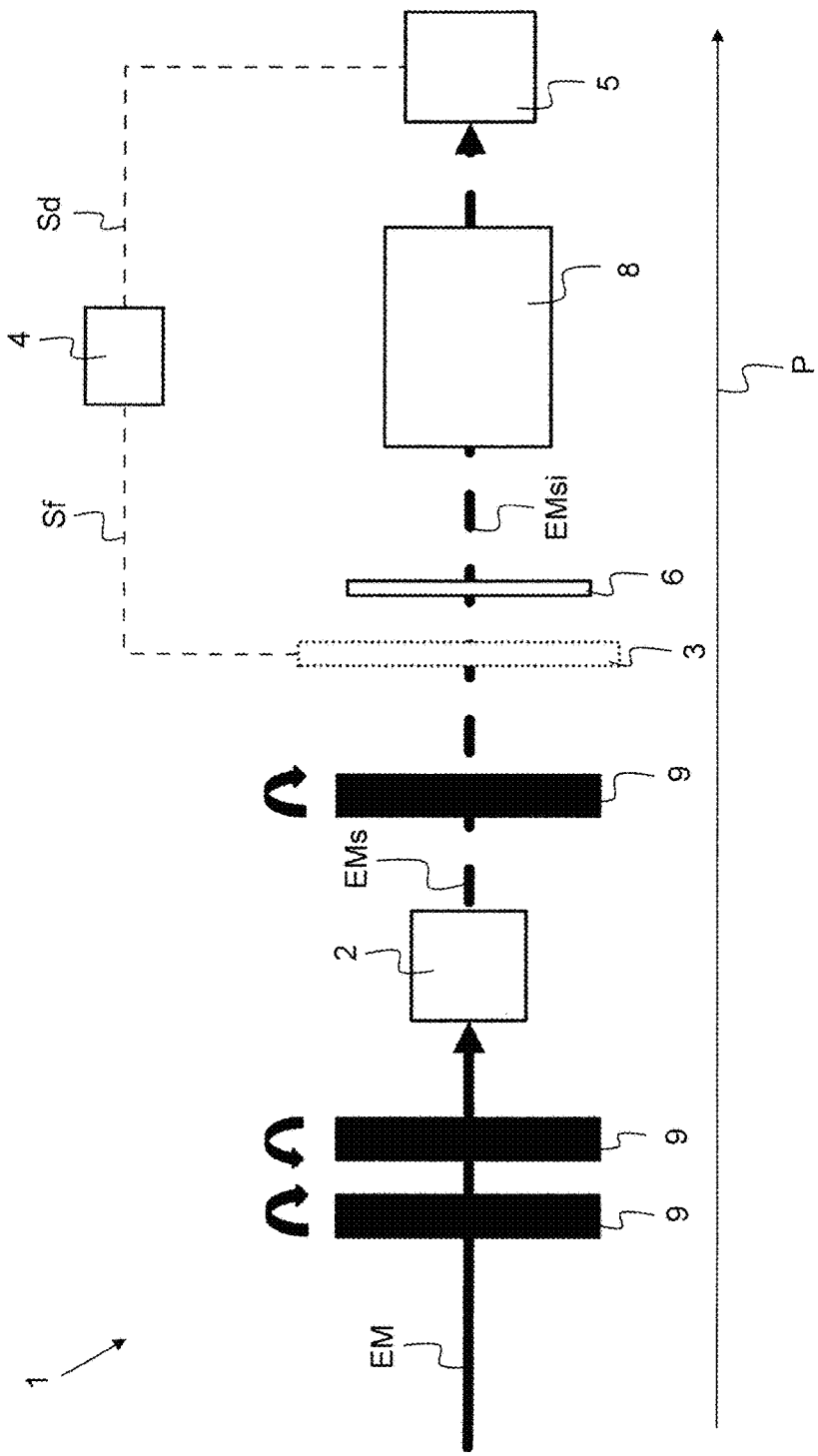
FIG. 7 shows a schematic view of a system comprising a frequency modulation device, an intensity modulation device, a separating device and three polarization conditioning elements.

This relationship is further illustrated in FIG. 4, wherein a masking device 7 comprising four focusing elements 10a, 10b, 10c, 10d being configured to focus incident electromagnetic radiation EMsi onto four areas a1, a2, a3, a4 of the detection device 5 is used. In this exemplary embodiment the frequency modulation device 3 modulates the incident electromagnetic radiation EMs with a sinusoidal frequency modulation signal Sf such that four frequency-modulated polarization states P1, P2, P3 and P4 are generated in the electromagnetic radiation EMs. Since the detection modulation signal Sd is in synchrony with this frequency modulation signal Sf, the micro-lens array 10a, 10b, . . . of the masking device 7 is triggered by the detection modulation signal Sd such that the electromagnetic radiation EMsi of a particular frequency-modulated polarization state P1, P2, P3 or P4 is directed to a particular area a1, a2, a3, a4 of the detection device 5. In the exemplary embodiment of FIG. 4 the micro-lens array 10a, 10b, . . . is triggered such that the second polarization state P2 is focused on to the second row a2 of the detection device 5. This second row a2 can be seen as the unmasked row. If, for example, the first frequency-modulated polarization state P1 corresponds to left-handed circularly polarized light, the second frequency-modulated polarization state P2 to vertically linearly polarized light, the third frequency-modulated polarization state P3 to right-handed circularly polarized light, and the fourth frequency-modulated polarization state P4 corresponds to horizontally linearly polarized light, the system 1 would allow a detection of the left-handed circularly polarized light on the highest pixel row a1 of the detection device 5, a detection of the vertically linearly polarized light on the second highest pixel row a2 of the detection device 5, a detection of the right-handed circularly polarized light on the second lowest pixel row a3 of the detection device 5, and a detection of the horizontally linearly polarized light on the lowest pixel row a4 of the detection device 5, for example. In other words, the masking device 7 is configured to cycle the frequency-modulated polarization states P1, P2, P3, P4 between the pixel rows a1, a2, a3, a4 of the CCD sensor 5. Since the masking device 7 cycles the photo charges in synchrony with the detection modulation signal Sd, a particular pixel row a1, a2, a3 or a4 detects a particular polarization state P1, P2, P3 or P4 of the incident electromagnetic radiation EMsi.

Moreover, in the event that a spectrometer 8 is used which breaks incident electromagnetic radiation EMs, EMsi in dependence of its wavelength, the detection device 5 furthermore detects a particular polarization state P1, P2, P3, P4 of incident electromagnetic radiation EMs, EMsi in dependence of its wavelength. For example, if each pixel row a1, a2, . . . comprises three pixels (not shown), a lowest wavelength or wavelength-range could be detected by the first pixel of a particular pixel row, an intermediate wavelength or wavelength-range could be detected by the second pixel of said particular pixel row, and a highest frequency or frequency-range could be detected by the third pixel of said particular pixel row.

The system 1 depicted in FIGS. 5 to 8 further comprises one or more polarization conditioning elements 9. A polarization conditioning element 9 is configured to change a polarization state of electromagnetic radiation EMs, EMsi being incident on the polarization conditioning element 9.

The polarization conditioning elements 9 correspond to one or more linear rotators and/or to one or more circular rotators. A linear rotator 9 is configured to rotate the plane of polarization of incident linearly polarized electromagnetic radiation EM, EMs, EMsi and to reverse the sense of incident circularly polarized electromagnetic radiation EM, EMs, EMsi. A circular rotator 9 is configured to reverse the sense of incident circularly polarized electromagnetic radiation EM, EMs, EMsi. The linear and circular rotators 9 are in each case preferably half-wave plates. Moreover, the half-wave plates being used as linear rotators 9 preferably rotate within the optical path P extending from the excitation source towards the sample 2, i.e. within the excitation path, and/or within the optical path P extending from the sample 2 towards the detection device 5, i.e. within the collection path. The half-wave plates being used as circular rotators 9 are preferably repeatedly moved into and out of the optical path P.

Depending on the number of as well as on the particular arrangement of the one or more polarization conditioning elements 9 different effects can be achieved. In fact, the system 1 according to FIG. 5 comprises a single polarization conditioning element 9 being a linear rotator which is arranged before the sample 2 with respect to the optical path P, i.e. the linear rotator 9 is arranged in the excitation path. The linear rotator serves the purpose of scrambling the polarization of the incident electromagnetic radiation. The system 1 according to FIG. 6 comprises two polarization conditioning elements 9 being in each case a linear rotator. One linear rotator 9 is arranged before the sample 2 with respect to the optical path P, i.e. in the excitation path, and the other linear rotator 9 is arranged after the sample 2 with respect to the optical path P, i.e. in the collection path. As indicated by the arrows pointing along the same sense of rotation both linear rotators 9 are rotated along the same sense of rotation. If two or more linear rotators 9 are used a faster scrambling of the polarization is achieved. The system 1 according to FIG. 7 comprises three polarization conditioning elements 9 being in each case a linear rotator. To this end two linear rotators 9 are arranged before the sample 2 with respect to the optical path P, i.e. in the excitation path, and one linear rotator 9 is arranged after the sample 2 with respect to the optical path P, i.e. in the collection path. The two linear rotators 9 in the excitation path are rotated along opposite senses of rotation as indicated by the arrows pointing along different senses of rotation. These linear rotators 9 are arranged and rotated such, that the polarization of incident electromagnetic radiation EM, EMs is destroyed. In other words, the linear rotators 9 are configured to generate unpolarised electromagnetic radiation EM that is irradiated on to the sample 2 and to eliminate linearly polarized states from the electromagnetic radiation EMs being emitted from the sample 2. The system 1 according to FIG. 8 comprises three polarization conditioning elements 9 as it is the case in the system 1 according to FIG. 7 and additionally comprises two circular rotators 9. A first circular rotator 9 is arranged after the two linear rotators 9 but before the sample 2 with respect to the optical path P, i.e. in the excitation path. A second circular rotator 9 is arranged after the sample 2 and after the third linear rotator 9 with respect to the optical path P, i.e. in the collection path. As indicated by the double arrow, the circular rotators 9 are moved into and out of the optical path P. These circular rotators 9 are preferably configured and arranged such that noise is eliminated when two or more spectral images are recorded and subtracted from each other. This procedure is also known as virtual enantiomers in the field of expertise.

Figure 8:
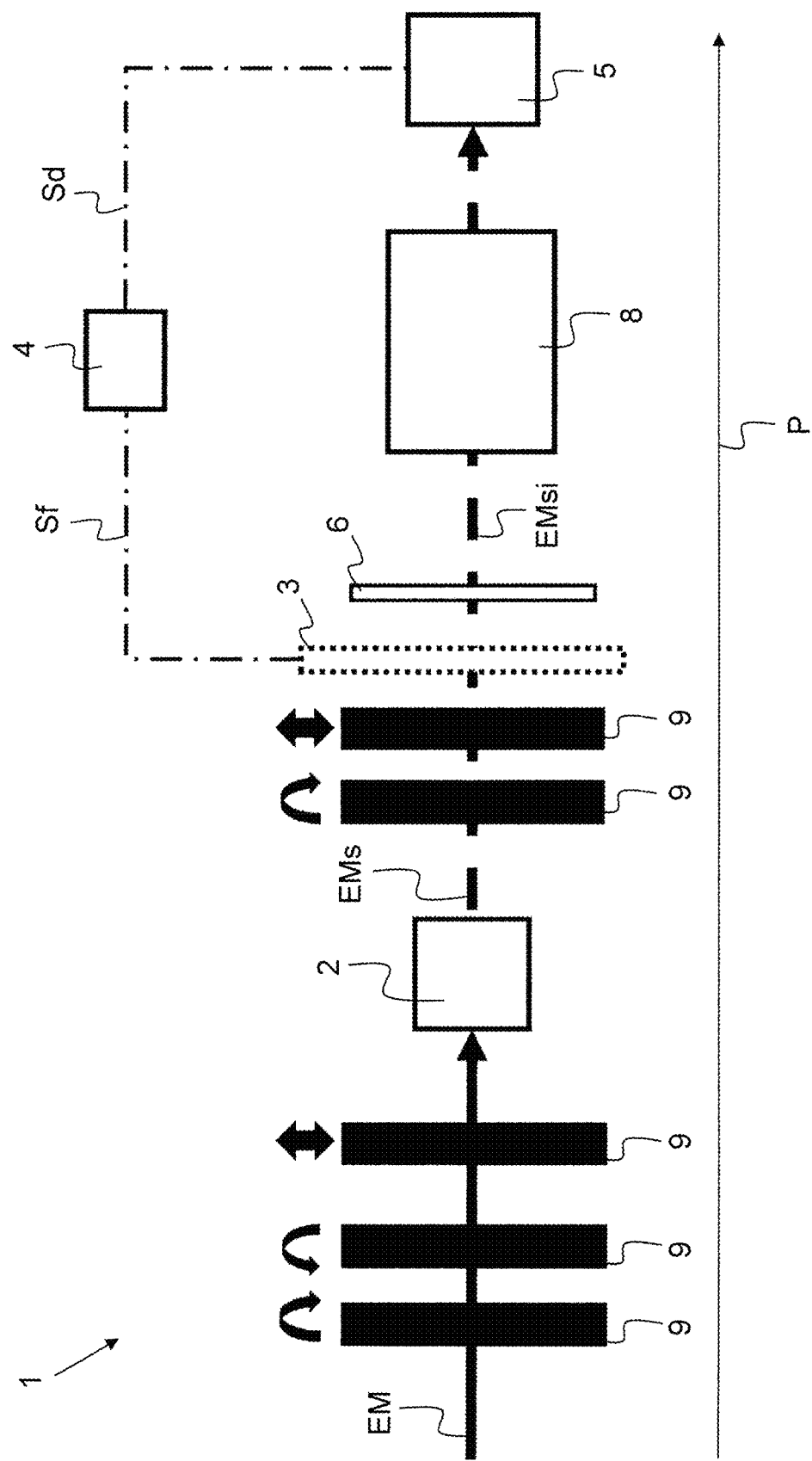
FIG. 8 shows a schematic view of a system comprising a frequency modulation device, an intensity modulation device, a separating device and five polarization conditioning elements.
Figure 9:
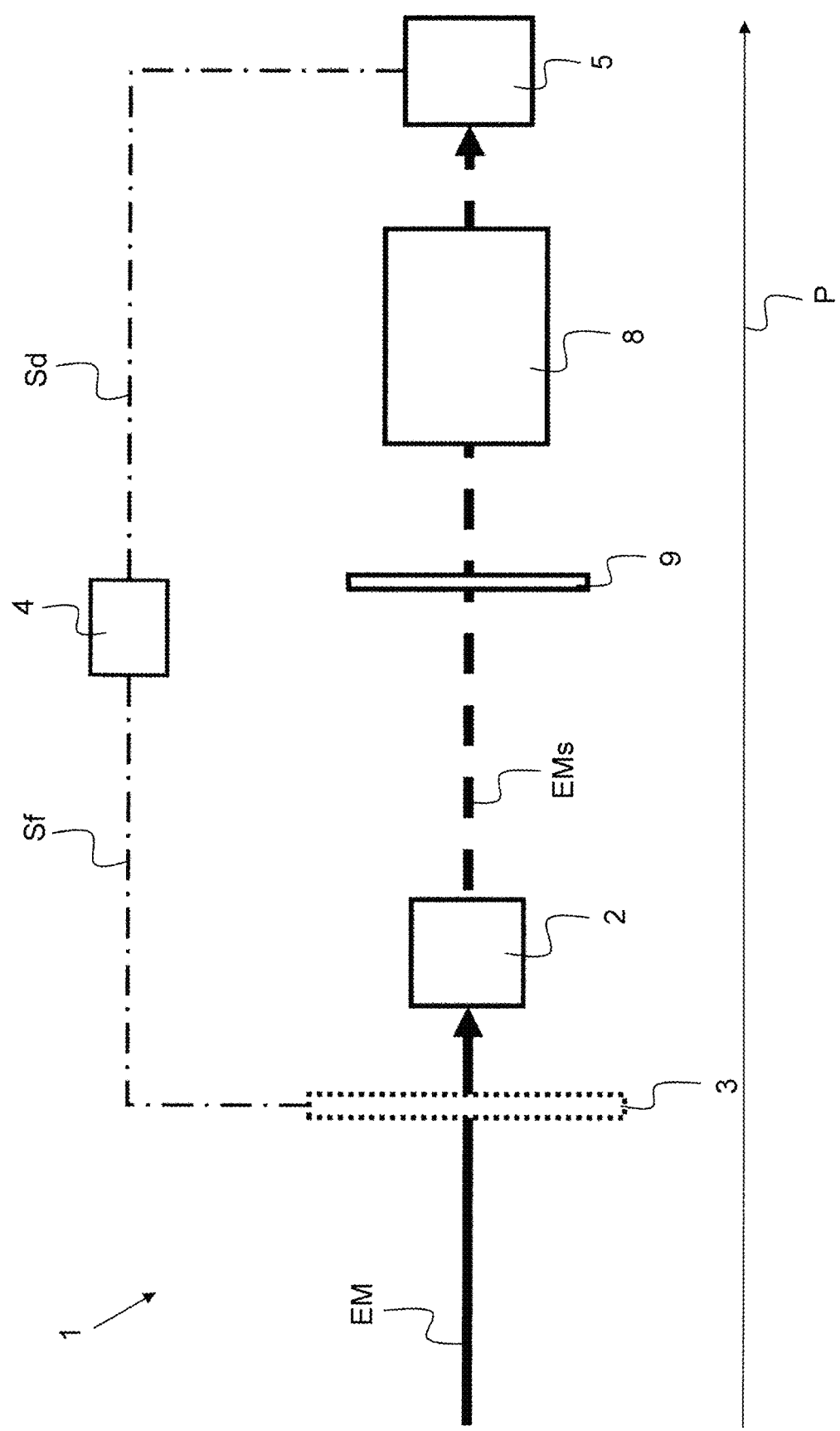
FIG. 9 shows a schematic view of a system comprising a frequency modulation device and a polarization conditioning element according to another embodiment.
Figure 10:
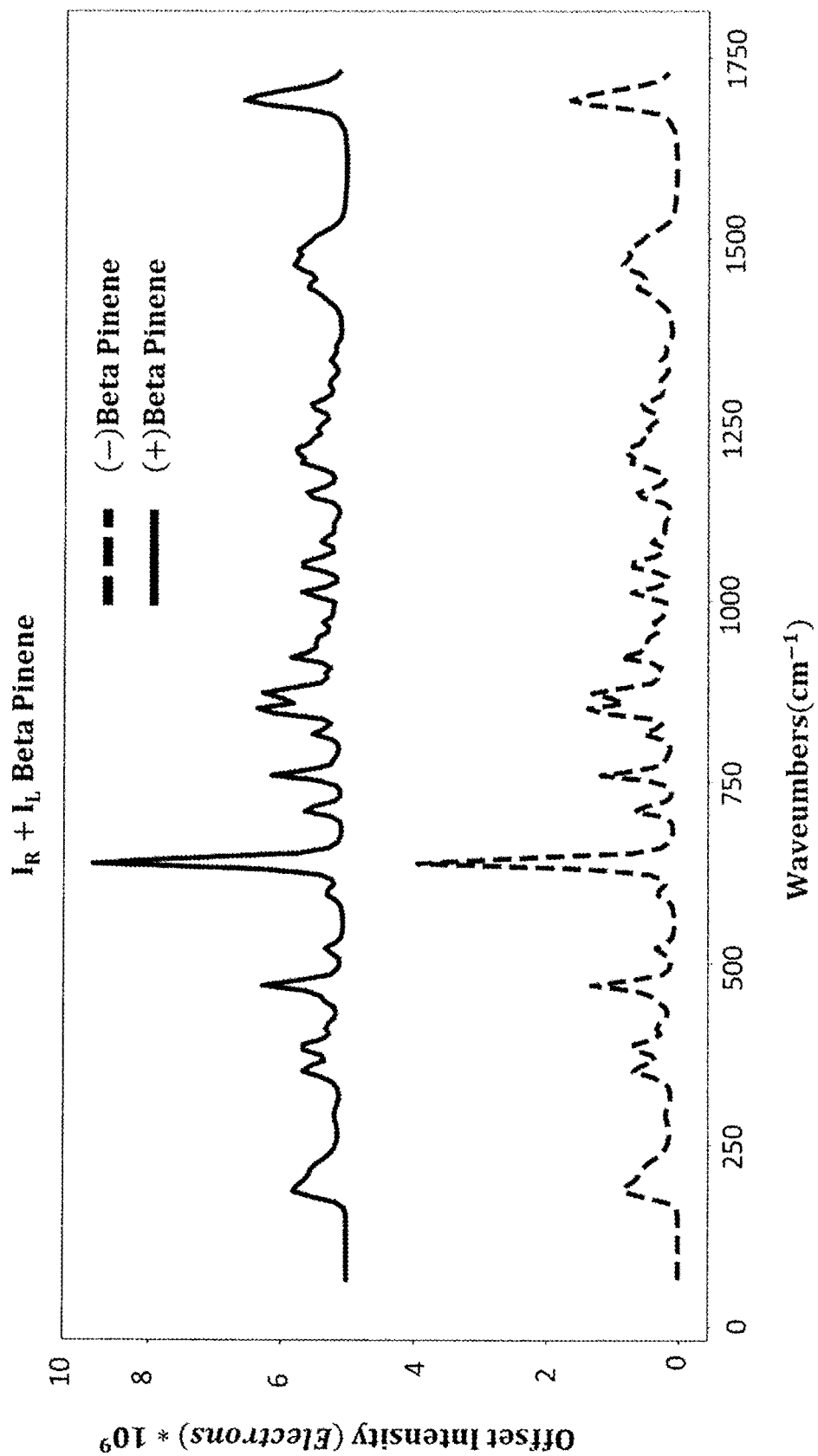
FIG. 10 shows spectra of the beta-Pinene enantiomers being recorded as the sum of left-circularly polarized electromagnetic radiation and right-circularly polarized electromagnetic radiation.
Figure 11:
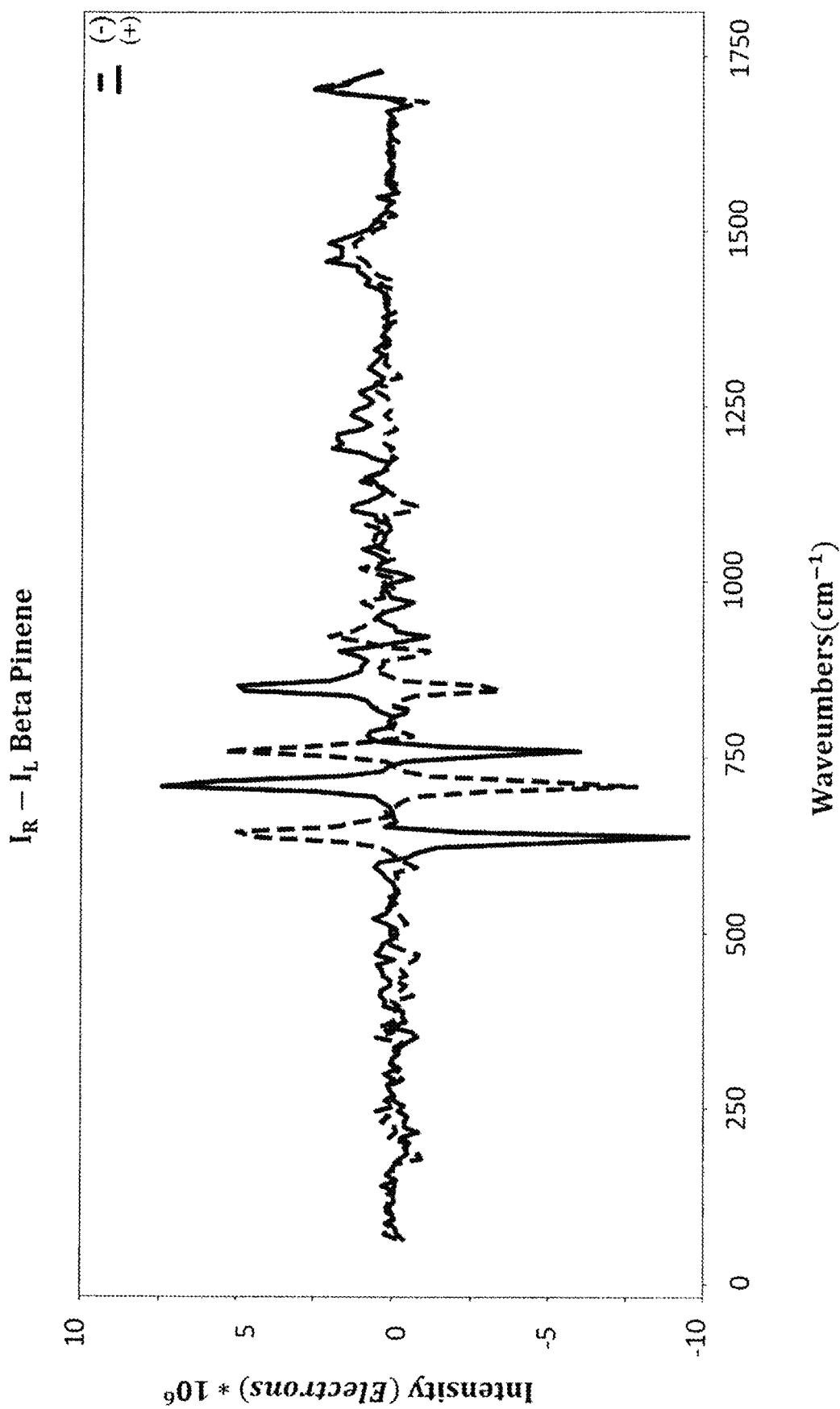
FIG. 11 shows spectra of the beta-Pinene enantiomers being recorded as the difference in right- and left-circularly polarized electromagnetic radiation.

FIGS. 10 and 11 depict two spectra that have been recorded with the system 1 according to FIG. 8, i.e. a system comprising, inter alia, a frequency modulation device 3 being arranged after the sample 2 with respect to the optical path P, an intensity modulation device 6 in the form of a linear polarizer, a spectrometer 8, three linear rotators 9 and two circular rotators 9. The spectra were measured in the forward scattering configuration, wherein laser light at 532 nanometer and at a power of 1.5 Watt was used to excite the sample 2. The sample 2 corresponds to a neat solution of beta-Pinene. FIG. 10 depicts the measured Raman signals for the (+) beta-Pinene enantiomer (solid line, upper trace) and for the (−) beta-Pinene enantiomer (dashed line, lower trace). Each signal corresponds to the sum of left-circularly polarized electromagnetic radiation ($I_L$) and right-circularly polarized electromagnetic radiation ($I_R$): $S=I_L+I_R$. The peaks in these signals correspond to vibrational modes of beta-Pinene. As follows from a comparison of the signal recorded for the (+) beta-Pinene enantiomer with the signal recorded for the (−) beta-Pinene enantiomer, the peaks are the same for both enantiomers. FIG. 11 depicts the Raman Optical Activity (ROA) spectrum of the two enantiomers of beta-Pinene, i.e. the difference in right- and left-circularly polarized electromagnetic radiation for the Raman scattering from the two enantiomers: $S=I_L-I_R$. The spectrum of (+) beta-Pinene enantiomer is depicted as solid line and the spectrum of (−) beta-Pinene enantiomer is depicted as dashed line. As follows from FIG. 11, the spectra of these two enantiomers are almost perfect mirror images of one another.

The invention claimed is:

1. A system for measuring the optical activity of a sample comprising:
at least one frequency modulation device;
at least one synchronization device; and
at least one detection device, wherein the at least one frequency modulation device is configured to modulate a frequency of incident electromagnetic radiation being at least one of i) emitted from a sample or ii) irradiated on to a sample with at least one frequency modulation signal, wherein the at least one synchronization device is configured to receive the at least one frequency modulation signal, wherein the at least one synchronization device is further configured to emit at least one detection modulation signal being synchronized with the at least one frequency modulation signal, wherein the system is configured such that the at least one detection device detects incident electromagnetic radiation in synchronization with the at least one detection modulation signal, wherein the frequency modulation device is configured to separate components of incident electromagnetic radiation having two or more polarization states into components of electromagnetic radiation having one or more frequencies, and wherein:
   i) the system further comprises at least one masking device, wherein the masking device is configured to mask one or more areas of the detection device such, that the detection device is prevented from detecting incident electromagnetic radiation in these one or more masked areas, wherein the synchronization device is in connection with the masking device, wherein the synchronization device is configured to send the detection modulation signal to the masking device, and wherein the masking device is configured to mask one or more areas of the detection device in synchronization with the detection modulation signal, or
   ii) the synchronization device is in connection with the detection device, wherein the synchronization device is configured to send the detection modulation signal to the detection device, and wherein the detection device is configured to detect incident electromagnetic radiation in synchronization with the detection modulation signal.

2. The system according to claim 1, wherein the system is configured such, that the components of electromagnetic radiation having one or more frequencies are detected simultaneously or temporarily delayed with respect to one another by the detection device.

3. The system according to claim 1, further comprising at least one intensity modulation device, wherein the intensity modulation device is configured such, that an intensity of incident electromagnetic radiation is modulated, whereby intensity-modulated electromagnetic radiation is generated.

4. The system according to claim 3, wherein the intensity modulation device is at least one of a polarizer or a linear polarizer.

5. The system according to claim 1, wherein the detection device is an image sensor and wherein the areas are at least two pixels, and wherein the masking device is configured to mask one pixel at a time.

6. The system according to claim 5, wherein the synchronization device is configured such, that a particular polarization state is detected by a particular pixel at a time.

7. The system according to claim 6, wherein the synchronization device is configured such, that a particular polarization state is detected by a particular pixel row at a time.

8. The system according to claim 5, wherein the areas are at least two pixel rows and wherein the masking device is configured to mask one or more pixel rows at a time, or
   wherein the areas are at least four or exactly four pixel rows and wherein the masking device is configured to mask at least three pixel rows or exactly three pixels rows at a time.

9. The system according to claim 1, further comprising at least one separating device, wherein the separating device is configured to spatially separate one or more wavelengths constituting incident electromagnetic radiation onto the detection device.

10. The system according to claim 9, wherein the separating device is configured to spatially separate one or more wavelengths constituting incident intensity-modulated electromagnetic radiation onto the detection device.

11. The system according to claim 1, further comprising an excitation source, wherein the excitation source is configured to excite the sample.

12. The system according to claim 11, wherein the excitation source is a laser.

13. The system according to claim 1, further comprising at least one of:
   a) one or more polarization conditioning elements, the polarization conditioning elements being configured to change a polarization state of electromagnetic radiation being incident on the polarization conditioning elements, or
   b) at least one filter element, preferably a Rayleigh filter, which is configured to filter one or more wavelengths of electromagnetic radiation being incident on the filter element.

14. The system according to claim 13, wherein at least one of:
   a) the polarization conditioning elements are arranged such, that at least one of i) the sample can be irradiated with electromagnetic radiation being unpolarised or ii) noise is reduced, or
   b) the filter element is at least one of i) a Rayleigh filter or ii) configured to filter one or more wavelengths of intensity-modulated electromagnetic radiation being incident on the filter element.

15. The system according to claim 1, wherein at least one of:
   i) the frequency modulation device is a high frequency modulation device, or
   ii) the frequency modulation device is configured to modulate with a frequency being higher than 500 Hz.

16. The system according to claim 15, wherein at least one of:
   i) the frequency modulation device is at least one of a photoelastic-modulator, a liquid crystal retarder, and a Pockels cell, or
   ii) the frequency modulation device is configured to modulate with a frequency being higher than 1 kHz.

17. The system according to claim 1, wherein the masking device is configured to mask one or more areas of the detection device such, that the detection device is prevented from detecting incident intensity-modulated electromagnetic radiation in these one or more masked areas.

18. The system according to claim 1, wherein the detection device is configured to detect incident intensity-modulated electromagnetic radiation in synchronization with the detection modulation signal.

19. A method for measuring the optical activity of a sample, the method comprising the steps of:

at least one of i) irradiating electromagnetic radiation onto a sample so as to excite the sample and modulating a frequency of the electromagnetic radiation being emitted from the excited sample with at least one frequency modulation signal of at least one frequency modulation device or ii) modulating a frequency of electromagnetic radiation being irradiated on to a sample with at least one frequency modulation signal of at least one frequency modulation device so as to excite the sample with frequency-modulated electromagnetic radiation, synchronizing at least one detection modulation signal with the at least one frequency modulation signal using at least one synchronization device, detecting electromagnetic radiation in synchronization with the at least one detection modulation signal using at least one detection device; and wherein the frequency modulation device is configured to separate components of incident electromagnetic radiation having two or more polarization states into components of electromagnetic radiation having one or more frequencies, and wherein:
  i) the system further comprises at least one masking device, wherein the masking device is configured to mask one or more areas of the detection device such, that the detection device is prevented from detecting incident electromagnetic radiation in these one or more masked areas, wherein the synchronization device is in connection with the masking device, wherein the synchronization device is configured to send the detection modulation signal to the masking device, and wherein the masking device is configured to mask one or more areas of the detection device in synchronization with the detection modulation signal, or
  ii) the synchronization device is in connection with the detection device, wherein the synchronization device is configured to send the detection modulation signal to the detection device, and wherein the detection device is configured to detect incident electromagnetic radiation in synchronization with the detection modulation signal.

20. The method according to claim 19, wherein the method measures the optical activity of a sample with a system comprising:
  at least one frequency modulation device;
  at least one synchronization device; and
  at least one detection device,
    wherein the at least one frequency modulation device is configured to modulate a frequency of incident electromagnetic radiation being at least one of i) emitted from a sample or ii) irradiated on to a sample with at least one frequency modulation signal,
    wherein the at least one synchronization device is configured to receive the at least one frequency modulation signal,
    wherein the at least one synchronization device is further configured to emit at least one detection modulation signal being synchronized with the at least one frequency modulation signal, and
  wherein the system is configured such that the at least one detection device detects incident electromagnetic radiation in synchronization with the at least one detection modulation signal.

21. A method of producing a system for measuring the optical activity of a sample, the method comprising the steps of:
  Providing at least one frequency modulation device;
  Providing at least one synchronization device; and
  Providing at least one detection device,
    wherein the at least one frequency modulation device is configured to modulate a frequency of incident electromagnetic radiation being at least one of i) emitted from a sample or ii) irradiated on to a sample with at least one frequency modulation signal,
    wherein the at least one synchronization device is configured to receive the at least one frequency modulation signal,
    wherein the at least one synchronization device is further configured to emit at least one detection modulation signal being synchronized with the at least one frequency modulation signal,
    wherein the system is configured such that the at least one detection device detects incident electromagnetic radiation in synchronization with the at least one detection modulation signal,
  wherein the frequency modulation device is configured to separate components of incident electromagnetic radiation having two or more polarization states into components of electromagnetic radiation having one or more frequencies, and
  wherein:
    i) the system further comprises at least one masking device, wherein the masking device is configured to mask one or more areas of the detection device such, that the detection device is prevented from detecting incident electromagnetic radiation in these one or more masked areas, wherein the synchronization device is in connection with the masking device, wherein the synchronization device is configured to send the detection modulation signal to the masking device, and wherein the masking device is configured to mask one or more areas of the detection device in synchronization with the detection modulation signal, or
    ii) the synchronization device is in connection with the detection device, wherein the synchronization device is configured to send the detection modulation signal to the detection device, and wherein the detection device is configured to detect incident electromagnetic radiation in synchronization with the detection modulation signal.

* * * * *